United States Patent [19]
Cho

[11] Patent Number: 5,910,194
[45] Date of Patent: Jun. 8, 1999

[54] VEHICLE BRAKE CABLE TENSION ADJUSTMENT APPARATUS

[75] Inventor: Won-bong Cho, Kyunggi-do, Rep. of Korea

[73] Assignee: Hyundai Motor Company, Kyunggi-do, Rep. of Korea

[21] Appl. No.: 08/911,033

[22] Filed: Aug. 14, 1997

[30] Foreign Application Priority Data

Dec. 15, 1996 [KR] Rep. of Korea ...................... 95-41926

[51] Int. Cl.⁶ .............................. B60T 11/04; F16C 1/22
[52] U.S. Cl. .................................... 74/500.5; 74/501.5 R; 74/502.4; 74/502.6; 74/526; 188/2 D; 188/196 R
[58] Field of Search ........................... 74/500.5, 501.5 R, 74/502.4, 502.6, 502, 526; 188/2 D, 196 R; 403/303

[56] References Cited

U.S. PATENT DOCUMENTS

| | | | |
|---|---|---|---|
| 4,515,036 | 5/1985 | Dotson | 74/535 |
| 4,991,700 | 2/1991 | Koga | 192/4 A |
| 5,386,887 | 2/1995 | Hilgert et al. | 188/2 D |
| 5,505,105 | 4/1996 | Kuo | 74/502.4 |
| 5,634,379 | 6/1997 | Barnard | 74/502.6 |
| 5,680,748 | 10/1997 | Barnard | 74/502.4 X |
| 5,690,193 | 11/1997 | Baumann et al. | 74/501.5 R X |

FOREIGN PATENT DOCUMENTS

2060809  5/1981  United Kingdom .................. 74/502.4

*Primary Examiner*—Vinh T. Luong
*Attorney, Agent, or Firm*—Finnegan, Henderson, Farabow, Garrett & Dunner, L.L.P.

[57] ABSTRACT

An automatic parking brake cable tension adjustment apparatus includes a first connecting member attached by a cable to a brake handle, a first pivoting member, a second pivoting member, a mechanical linkage between the first and second pivoting member, and a second connecting member attached by a cable to a parking brake. As the brake cable becomes extended past a certain point, the first pivoting member contacts a fixed stop and pivots, thereby pivoting the second pivoting member. A threaded connection between the second pivoting member and the second connecting member rotates, automatically adjusting the tension of the brake cable.

8 Claims, 3 Drawing Sheets

VEHICLE BRAKE CABLE TENSION ADJUSTMENT APPARATUS

BACKGROUND OF THE INVENTION

1. Field of the Invention

Under the provisions of 35 U.S.C. § 120, Applicant claims the benefit of the filing date of U.S. application Ser. No. 08/766,036, filed Dec. 16, 1996 now abandoned. The present invention relates to a parking brake for a vehicle, and more particularly to a parking brake cable tension adjustment apparatus by which tension of a parking brake cable can be continuously maintained at a constant level even though the cable becomes elongated, or a brake lining becomes worn.

2. Description of the Related Art

A vehicle typically is equipped with a parking brake in order to keep the vehicle at a stable position when it is parked.

A conventional parking brake includes, as illustrated in FIG. 5, a parking brake lever 51 disposed proximate a driver's seat, a cable 53 connected to the lever 51, and an equalizer 57 for equally dividing the force drawn by the cable 53 to a rear wheel brake apparatus 55 provided at the rear wheels.

FIG. 6 illustrates in detail an equalizer of a conventional parking brake, where the equalizer includes a support bracket 59 connected to the cable 53. Cable 53 is connected to both lateral ends of the support bracket 59 to thereby be connected to the rear wheel brake apparatus 55.

Furthermore, the bracket 59 is provided with an adjusting nut 61 which is connected to the cable for adjusting tension of the cable 53.

When the parking brake lever 51 thus constructed is pulled, the cable 53 is drawn up to thereby cause equal forces to be respectively transmitted to the rear wheel brakes through the equalizer 57 connected to the cable 53, thereby to operate the rear wheel brakes, so that balanced braking can be maintained. When the parking brake lever 51 is released, the braking of the rear wheel brakes connected to the cable 53 is also released.

Over time, the parking brake lining becomes worn. Moreover, as parking brake lever 51 is pulled repeatedly, the cable 53 becomes elongated.

When either of these events occurs, the adjusting nut 61 must be manually tightened to adjust the length of the cable, by which an optimum condition can be maintained.

However, there is a problem in the parking brake apparatus described above, because the adjusting nut has to be tightened to cause the elongated parking cable to maintain the appropriate tension. In order to tighten the adjusting nut, a rear console disposed near the driver's seat must be dismantled. This is a complicated and time-consuming procedure. Drivers therefore often neglect to adjust the brake cable, resulting in a possibly dangerous condition.

SUMMARY OF THE INVENTION

The present invention is provided to solve the aforementioned problems.

It is an object of the present invention to provide a parking brake cable tension adjustment-apparatus, by which an elongated brake cable can be automatically adjusted to thereby allow the brake cable to maintain a constant length.

In accordance with the objects of the present invention, there is provided a parking brake cable tension automatic control apparatus of a vehicle. The apparatus includes a parking brake lever; a first connecting member fixedly secured to the parking brake lever and to a brake cable and defining an axis; a first pivoting member connected to the first connecting member to pivot with respect to the first connecting member upon engagement with a fixed stop mounted to the vehicle; a second pivoting member aligned with the axis and pivotally connected to the first connecting member; a mechanical linkage linking the first pivoting member to the second pivoting member so that the second pivoting member pivots only when the first pivoting member pivots; and a second connecting member having two ends aligned with the axis, the first end pivotally connected to the second pivoting member and the second end connected to the parking brake cable.

BRIEF DESCRIPTION OF THE DRAWINGS

For a fuller understanding of the nature and objects of the invention, reference should be made to the following detailed description taken in conjunction with the accompanying drawings in which.

DETAILED DESCRIPTION OF THE PREFERRED EMBODIMENT

The preferred embodiment of the present invention will now be described in detail with reference to the accompanying drawings.

Figure 1:
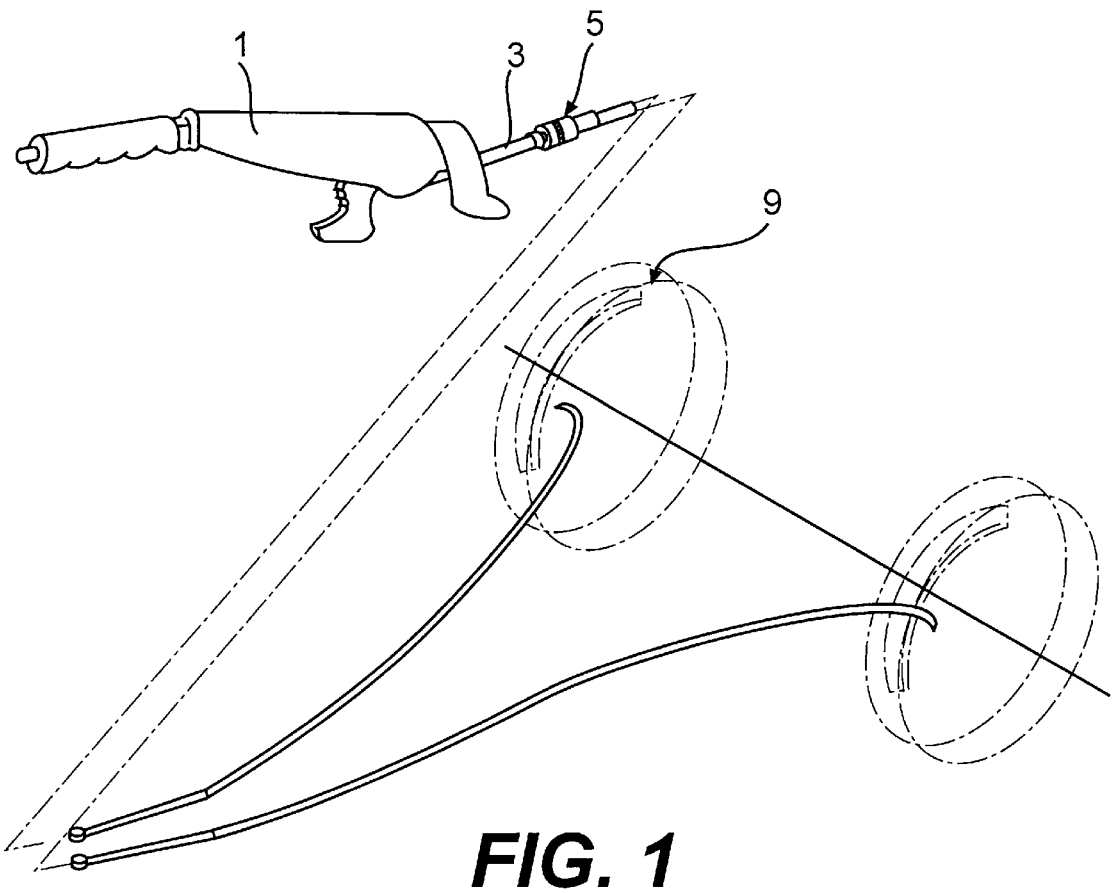
FIG. 1 is a perspective view illustrating an embodiment of the present invention.

FIG. 1 is perspective view for illustrating an embodiment of the present invention, depicting a parking brake lever 1 disposed proximate a driver's seat (not shown), a first portion of a parking brake cable 3 connected at one end thereof to the parking brake lever 1 and a second portion of the parking brake cable 3 connected at the other end thereof to a rear wheel brake apparatus 9, and a tension adjustment apparatus 5 disposed at a middle section of the cable 3.

The parking brake lever 1 and the rear wheel brake apparatus 9 are conventional, and will not be described further.

Figure 2:
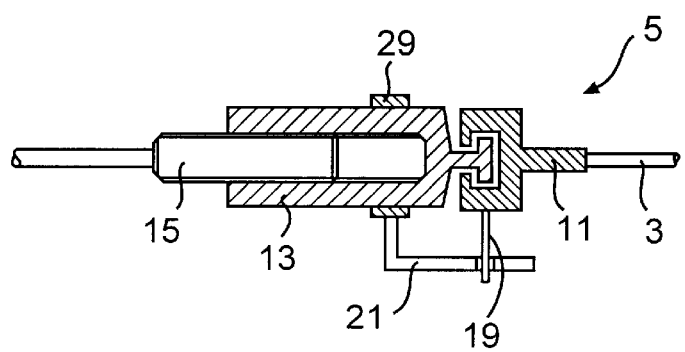
FIG. 2 is a cross-sectional view of FIG. 4A illustrating a parking brake cable tension adjustment apparatus of a vehicle according to the present invention.
Figure 3:
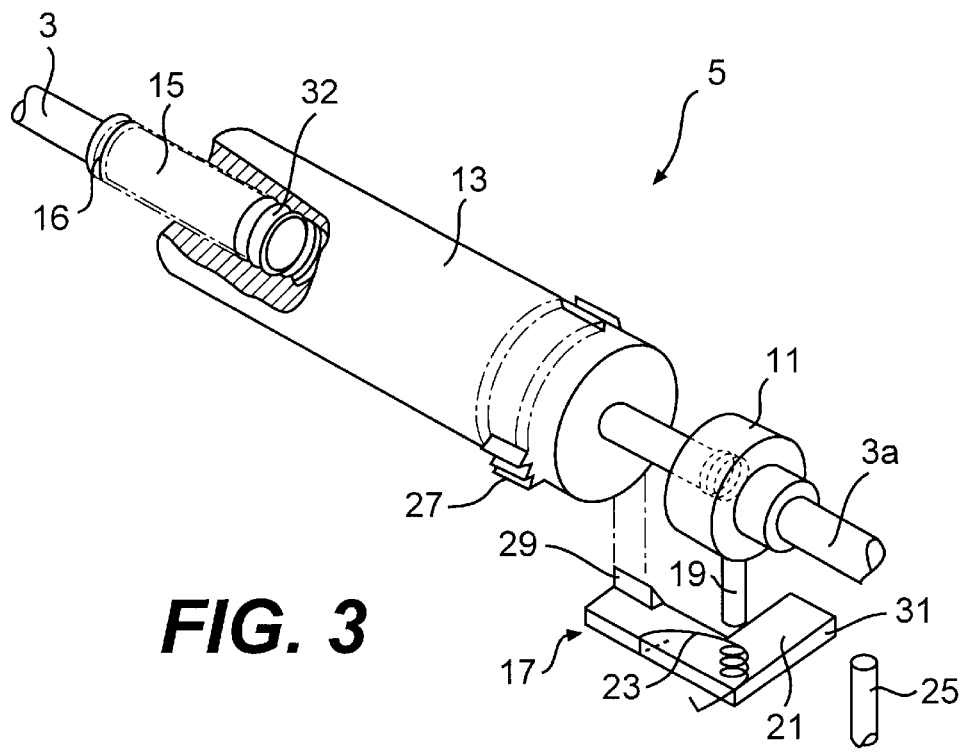
FIG. 3 is a perspective view illustrating a parking brake cable tension adjustment apparatus of a vehicle according to the present invention.

FIG. 2 is a sectional view for illustrating an automatic cable tension adjustment apparatus according to the present invention. FIG. 3 is an exploded perspective view of what is shown in FIG. 2. A first connecting member 11 is connected directly to the cable 3a and indirectly to the parking brake lever 1 via the cable 3a. A pivoting member 13 connects to a distal end of the first connecting member 11, and a second connecting member 15 is disposed at an end portion of the second pivoting member 13.

The generally cylindrical first connecting member 11 is formed at a periphery thereof with a hinge axle 19, which projects from the periphery of first connecting member 11.

Another pivoting member 17 is coupled to the hinge axle 19. Pivoting member 17 is provided to rotate the pivoting member 13, as described below.

The pivoting member 17 is an apparatus for controlling the parking cable 3 when the cable 3 is elongated or contracted. Pivoting member 17 includes a generally L-shaped first pivoting bracket 21 coupled to the hinge axle 19 so that the bracket member 21 rotates about hinge axle 19. An elastic spring member 23 is disposed at the rotary bracket 21.

Figure 4A:
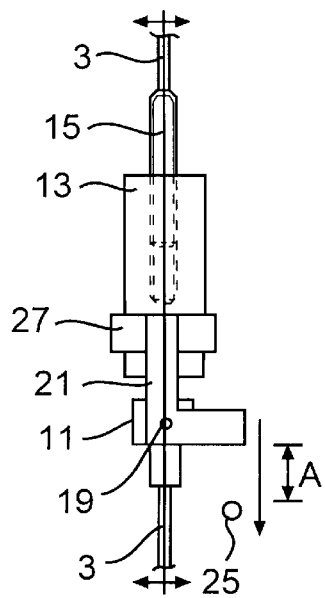
FIGS. 4A and 4B are bottom views illustrating an operational status of the apparatus according to the present invention.

The L-shaped bracket 21 is disposed along a passage in the vehicle, and moves in a lengthwise direction corresponding to the direction in which the cable 3 is pulled. A supporting protruder or stop 25 is fixedly secured to a body of the vehicle. During initial operation of the brake, bracket 21 is spaced a predetermined distance "A" from stop 25, as shown in FIG. 4A.

The bracket 21 has a tooth 29 projecting from its upper surface, which faces teeth or latches 27 disposed about the periphery of the pivoting member 13. Furthermore, bracket 21 includes a cam surface 31, disposed perpendicular to the lengthwise direction of movement of the bracket 21.

The latches 27 are part of a ratchet mechanism, which is so constructed as to be rotated only in one direction.

The cam surface 31 is constructed such that it stays away from the protruding stop 25 when the cable 3 is elongated within a predetermined length according to operation of the parking brake lever 1. Cam surface 31 contacts the protruding stop 25 only when cable 3 is elongated more than the predetermined length, or when brake linings are sufficiently worn that the cable 3 must be pulled a longer distance in order to engage the brakes.

The elastic spring member 23 is inserted at its center into the hinge axle 19, and is securely fitted at one end thereof to one side of the first connecting member 11. It is fixed at the other end thereof to one side of the rotary bracket 21. However, it is so structured as to be rotated in a clockwise direction.

The direction of force working on the elastic spring member 23 is not critical. For example, if the elastic spring member 23 is to be structured as to be rotated counterclockwise by elastic force, meshing between the second connecting member 15 and the pivoting member 13 can be changed in direction from that of a right-handed screw to that of a left-handed screw.

The pivoting member 13 is formed with inner threads which are meshed to outer threads of the second connecting member 15 for rotation. When the pivoting member 13 and second connecting member rotate with respect to one another in a predetermined direction, the second connecting member 15 moves further into the pivoting member 13 to increase tension in the parking brake cable 3.

The pivoting member 13 is generally cylindrical and includes the latches 27 formed on its periphery, which in turn engage with the tooth 29 of the bracket 21, defining a mechanical linkage between pivoting member 17 and pivoting member 13, to thereby rotate or pivot the pivoting member 13 when the pivoting member 17 pivots.

The second connecting member 15 is generally cylindrical and is formed at an external periphery thereof with screw threads 32 to thereby be meshed with the pivoting member 13. It further is connected to the rear wheel brake apparatus 9 through the medium of the second portion of the parking brake cable 3b.

Figure 4B:
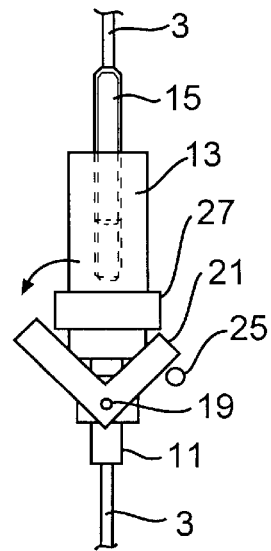
Figure 5:
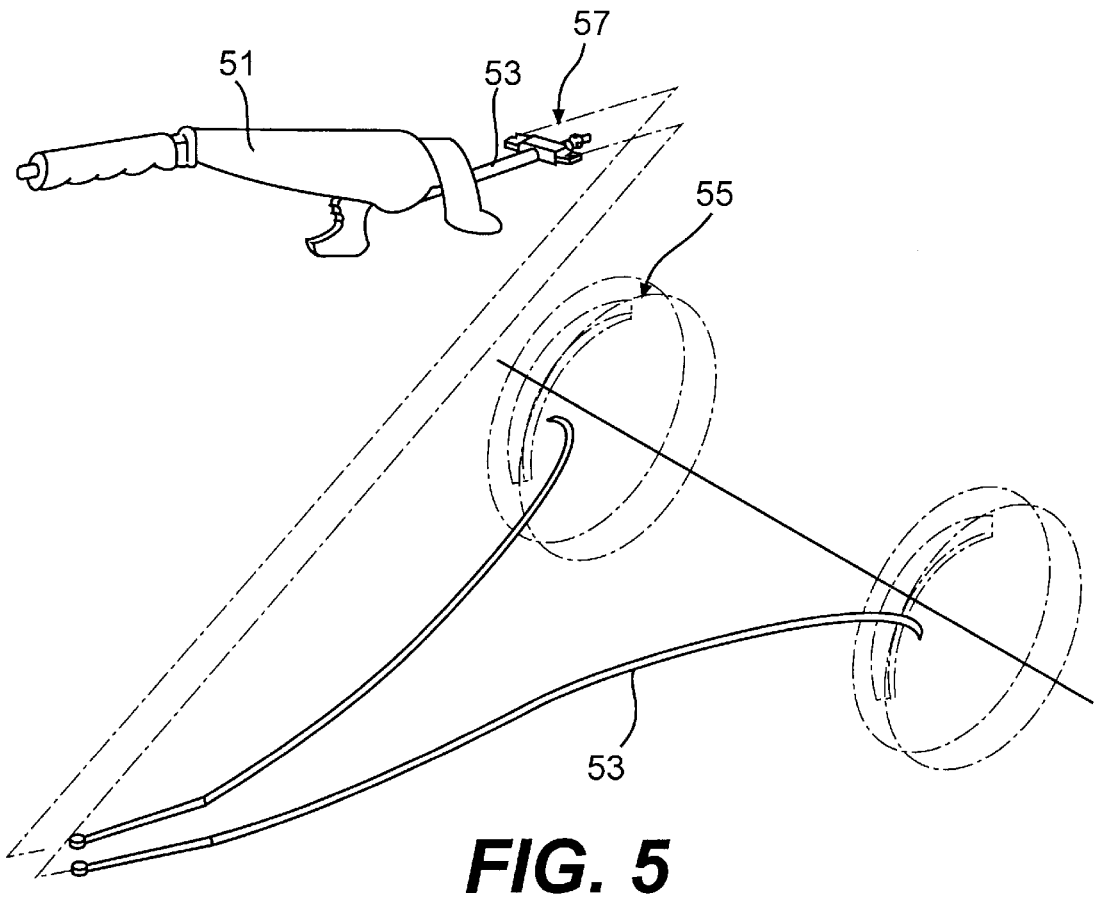
FIG. 5 is a perspective view illustrating a conventional parking brake apparatus.
Figure 6:
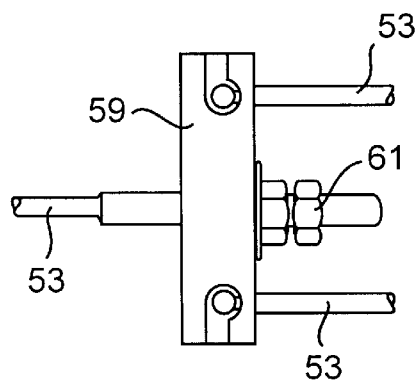
FIG. 6 is a plan view illustrating in detail a conventional tension control apparatus.

Operation of the automatic parking brake tension adjustment apparatus thus constructed is illustrated in FIGS. 4A and 4B.

FIG. 4A illustrates a state where the parking brake lever 1 is not pulled up.

When the brake lever 1 is pulled up, the first portion of the parking cable 3 is moved to pull the first connecting member 11 according to the operation of the parking brake lever 1.

At this time, because the first connecting member 11 is connected to the pivoting member 13, the pivoting member 13 is successively pulled to thereby operate the second connecting member 15, the second portion of the parking brake cable 3, and the rear wheel brake apparatus 9.

At this time, the pivoting member 17 is moved toward the projecting stop 25, but does not contact stop 25 as long as the cable 3 is within a predetermined length. In other words, the parking brake lever 1 and the rear brake apparatus 9 are operated normally within the predetermined distance "A" region.

Over time, there occurs an occasion when the parking cable 3 should be tightened due to wear of the brake lining as the running and braking operations of the vehicle are repeatedly performed, or when the cable 3 becomes elongated. An operational state of this condition is illustrated in FIG. 4B.

In FIG. 4B, the first connecting member 11 is moved by pulling the parking brake lever 1, and the cam surface 31 of the pivoting member 17 contacts the protruding stop 25.

The bracket 21 reaches the protruding stop 25 when the parking brake lever 1 is continuously pulled. Bracket 21 is rotated counterclockwise around the contacted point.

When the bracket 21 rotates counterclockwise, one of the latches 27 formed at the peripheral surface of the pivoting member 13 is pushed by the tooth 29 projecting from rotary bracket 21. Accordingly, pivoting member 13 also rotates.

When the pivoting member 13 is rotated, the pivoting member 13 moves along the screw threads formed at the periphery of the second connecting member 15 to thereby adjust the loosened tension of the parking cable to the original adjustment state.

When the parking brake lever 1 is released, the first connecting member 11 is returned to its original position, and moves along a slant surface of the tooth 29 by the elastic spring member 23 disposed at one side of the bracket 21.

As will be apparent from the foregoing description, there is an advantage in the automatic parking brake cable tension adjustment apparatus for a vehicle according to the present invention, in that ever-changing tension of the parking cable can be automatically adjusted, thereby alleviating the inconvenience of manually adjusting the cable.

There is another advantage in that the parking cable is maintained in tension at a constant state at all times so that the parking brake can be optimally operated, thereby maintaining stability of the vehicle.

Additional advantages and modifications will occur to those skilled in the art. The invention, in the broader aspects, is not limited to the specific details provided above. The scope of the invention is defined by the attached claims and their equivalents.

What is claimed is:

1. A vehicle parking brake cable tension adjustment apparatus adapted for connection between a first parking brake cable portion extending from a brake lever and a second parking brake cable portion extending from a vehicle brake apparatus, comprising:

a first connecting member adapted for attachment in axial alignment to the first parking brake cable portion;

a first pivoting member connected to the first connecting member to pivot with respect to the first connecting member upon engagement with a fixed stop;

a second pivoting member axially aligned with said first connecting member and pivotally connected to the first connecting member;

a mechanical linkage linking the first pivoting member to the second pivoting member, configured so that the second pivoting member pivots only when the first pivoting member pivots upon engagement with the stop; and a second connecting member having two ends and being axially aligned with the first connecting member and the second pivoting member, the first end being pivotally connected to the second pivoting member, and the second end being attachable to the second parking brake cable portion extending from the vehicle brake apparatus.

2. The apparatus of claim 1, wherein the first pivoting member includes an L-shaped bracket pivotally connected to a pin projecting from the first connecting member.

3. The apparatus of clam 1, wherein the mechanical linkage includes a tooth projecting from the first pivoting member engaging a ratchet fixed to the second pivoting member.

4. A vehicle parking brake assembly, comprising:

a brake handle a first brake cable portion protecting from the brake handle;

a first connecting member attached in axial alignment to the first brake cable portion;

a first pivoting member connected to the first connecting member to pivot with respect to the first connecting member upon engagement with a fixed stop;

a second pivoting member axially aligned with and pivotally connected to the first connecting member;

a mechanical linkage linking the first pivoting member to the second pivoting member, configured so that the second pivoting member pivots only when the first pivoting member pivots upon engagement with the stop;

a second connecting member having two ends and aligned with the axis, the first end pivotally connected to the second pivoting member; and a second brake cable portion protecting from the second end of the second connecting member, and having a distal end adapted for attachment to a vehicle parking brake apparatus.

5. The assembly of claim 4, wherein the first pivoting member includes an L-shaped bracket pivotally connected to a pin projecting from the first connecting member.

6. The assembly of claim 4, wherein the mechanical linkage includes a tooth projecting from the first pivoting member engaging a ratchet fixed to the second pivoting member.

7. The assembly of claim 4, wherein the first and second brake cable portions have an initial length, and the first pivoting member is initially spaced a selected distance from the fixed stop.

8. The assembly of claim 7, wherein the first and second brake cable portions are configured to become extended over time to a second length greater than their initial length, and as the first and second cable portions extend to the second length, the selected distance between the first pivoting member and the fixed stop diminishes.

* * * * *

UNITED STATES PATENT AND TRADEMARK OFFICE
CERTIFICATE OF CORRECTION

PATENT NO. : 5,910,194
DATED : June 8, 1999
INVENTOR(S) : Won-bong CHO

It is certified that error appears in the above-indentified patent and that said Letters Patent is hereby corrected as shown below:

Claim 4, Col. 5, line 26, "protecting" should read --projecting--.

Claim 4, Col. 6, line 10, "protecting" should read --projecting--.

Signed and Sealed this

Second Day of November, 1999

Q. TODD DICKINSON

Attest:

Attesting Officer

Acting Commissioner of Patents and Trademarks